United States Patent
Liu et al.

(10) Patent No.: US 11,190,986 B2
(45) Date of Patent: Nov. 30, 2021

(54) MECHANISMS OF STATUS REPORTING AND PROTECTED PERIOD SETTING FOR COORDINATED TRANSMISSION IN MULTIPLE AP SYSTEM

(71) Applicant: MediaTek Singapore Pte. Ltd., Solaris (SG)

(72) Inventors: Jianhan Liu, San Jose, CA (US); Yongho Seok, San Jose, CA (US); James June-Ming Wang, San Jose, CA (US); James Chih-Shi Yee, San Jose, CA (US); Thomas Edward Pare, Jr., San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 149 days.

(21) Appl. No.: 16/590,130

(22) Filed: Oct. 1, 2019

(65) Prior Publication Data
US 2020/0120544 A1    Apr. 16, 2020

Related U.S. Application Data

(60) Provisional application No. 62/745,486, filed on Oct. 15, 2018.

(51) Int. Cl.
*H04W 28/26* (2009.01)
*H04L 5/00* (2006.01)
(Continued)

(52) U.S. Cl.
CPC .......... *H04W 28/26* (2013.01); *H04L 5/0035* (2013.01); *H04W 24/10* (2013.01);
(Continued)

(58) Field of Classification Search
CPC . H04W 88/12; H04W 24/10; H04W 28/0278; H04W 28/16; H04W 28/26;
(Continued)

(56) References Cited

U.S. PATENT DOCUMENTS

2016/0197655 A1   7/2016   Lee et al.
2018/0184401 A1   6/2018   Ghosh et al.
(Continued)

FOREIGN PATENT DOCUMENTS

EP    2863700 A1    4/2015
WO    2014/074919 A1    5/2014

*Primary Examiner* — Kevin C. Harper (57) ABSTRACT

Mechanisms of CCA status reporting and NAV distribution for coordinated transmissions in a multi-AP WLAN. A coordinator AP may broadcast a RTS frame to a set of coordinated APs, which allow the coordinated APs with a CCA clear status to set a protected period in a CST frame to silence the associated non-AP STAs. The coordinator AP also polls the coordinated APs to have them individually report their CCA statuses as well as additional information used for transmission coordination. In some embodiments, a status report from a coordinated AP may integrate the protected period setting and the CCA clean status indication, and therefore the coordinator AP just needs to poll for such a report without using RTS/CTS exchange. A coordinated AP may set a protected period to end at the complete transmission of a coordination frame. The coordination frame may specify the remaining TXOP duration information.

23 Claims, 11 Drawing Sheets

(51) Int. Cl.
*H04W 74/06* (2009.01)
*H04W 24/10* (2009.01)
*H04W 72/04* (2009.01)
*H04W 28/02* (2009.01)
*H04W 88/12* (2009.01)
*H04W 84/12* (2009.01)

(52) U.S. Cl.
CPC ... *H04W 28/0278* (2013.01); *H04W 72/0406* (2013.01); *H04W 74/06* (2013.01); *H04W 88/12* (2013.01); *H04W 84/12* (2013.01)

(58) Field of Classification Search
CPC .. H04W 72/0406; H04W 74/06; H04L 5/0035
See application file for complete search history.

(56) References Cited

U.S. PATENT DOCUMENTS

| | | | |
|---|---|---|---|
| 2018/0184402 A1 | 6/2018 | Cariou et al. | |
| 2019/0334590 A1* | 10/2019 | Son | H04L 27/2602 |
| 2020/0068585 A1* | 2/2020 | Yoshikawa | H04W 28/0278 |
| 2020/0374870 A1* | 11/2020 | Guo | H04W 28/16 |

* cited by examiner

MECHANISMS OF STATUS REPORTING AND PROTECTED PERIOD SETTING FOR COORDINATED TRANSMISSION IN MULTIPLE AP SYSTEM

CROSS-REFERENCE TO RELATED APPLICATION

This patent application claims priority and benefit of the U.S. Provisional Patent Application No. 62/745,486, entitled "STATUS REPORTING AND PROTECTED SETTING UP FOR COORDINATED TRANSMISSIONS IN MULTIPLE AP SYSTEMS" filed on Oct. 15, 2018, the entire content of which is incorporated herein by reference for all purposes.

TECHNICAL FIELD

Embodiments of the present disclosure relate generally to the field of wireless local area network (WLAN) communication, and more specifically, to the field of communication protocols used in coordinated transmissions.

BACKGROUND OF THE INVENTION

Before a wireless local area network (WLAN) station (STA) transmits a frame, it must ensure that the wireless transmission medium is idle to prevent transmission collision in an upcoming transmission opportunity. Clear Channel Assessment (CCA) is commonly used to determine whether the medium is idle by physical and virtual carrier sensing and energy detection. Network Allocation Vector (NAV) is another mechanism for purposes of collision avoidance. NAV allows STAs to indicate the amount of time required for transmission of the next frames, and in effect to reserve the medium as busy for the frames. The Request-To-Send (RTS) and Clear-To-Send (CTS) mechanism is still another mechanism used to avoid collisions, particularly those caused by hidden nodes, by reserving the channel for transmitting data from one STA to another. When a transmit STA intends to transmit data to another STA, it sends out a Request to Send (RTS) frame. The receive STA replies with a Clear-to-Send (CTS) frame. After the STA receives the CTS frame, it transmits the data packets. The RTS/CTS frames perform NAV distribution by specifying a value in a duration field, based on which each affected nearby STA maintains a countdown timer of how much more time the medium is reserved by the RTS/CTS exchange. In a CCA process, the medium is considered busy if the NAV value is greater than 0.

SUMMARY OF THE INVENTION

A conventional wireless local area network (WLAN) may use multiple access points (APs) to meet the requirements for large coverage areas. The APs in the WLAN can only transmit independently of each other and in respectively allocated and fixed channels. For example, each occupies a separate 80 MHz channel. A coordinated multi-AP system is different in that multiple APs are configured to coordinate to achieve coordinated transmissions. Particularly, a coordinator AP can perform a transmission coordination process and then initiate a coordinated transmission in which multiple coordinated APs transmit simultaneously. The coordinator AP can flexibly allocate the resource units (RUs) of a single channel to the APs. For example, for a coordinated transmission opportunity (TXOP), one coordinated AP is allocated with a 60 MHz subchannel and the other is allocated with the other 20 MHz subchannel. In another coordinated TXOP, the coordinated APs may be allocated with different subchannels of the 80 MHz channel.

Embodiments of the present disclosure provide communication mechanisms to ensure that, before a coordinator AP initiates a coordinated transmission, the medium is idle for all the coordinated APs and that each coordinated AP sets up a protected period for the upcoming coordinated transmission. Additional useful information may also be reported to the coordinator AP to assist the coordination process.

In some embodiments of the present disclosure, before a coordinator initiates a coordinated transmission, it broadcasts a multi-user (MU) Request-To-Send (RTS) frame to a set of coordinated APs. Based on the outcomes of the CCA processes, the coordinated APs having idle medium respond to the coordinator AP with a CTS frame, and the others do not respond with a CTS frame. The CTS frame specifies a protected period operable to silence the STAs associated with the coordinated AP during the following coordination process in which the coordinator AP communicates with the coordinated APs.

Even though CTS frames may be transmitted only if the coordinated AP has idle medium as determined from a CCA process (or "a CCA clear status"), the coordinator AP may not be able to identify which coordinated APs have a clean CCA status because the CTS frames from these APs overlap temporally, use a legacy format and contain identical information. Additional frames may be exchanged between the one or more coordinated APs with the coordinator AP to report AP-specific information. In some embodiments, the coordinator AP polls the coordinated APs, and each coordinated AP with a CCA clear status responds with a status report. The status report may be a conventional Bandwidth Query Report (BQR), or may additionally include IDs, buffer statuses, available bandwidths, and allowable transmit powers, etc., of each the coordinated AP. Through RTS/CTS exchanges and status polling and reporting, the coordinator AP is advantageously enabled to identify a coordinated AP with a CCA clear status and allow the coordinated AP to set a protected period for a coordinated TXOP.

In a WLAN without a legacy device, e.g., a post-high efficiency (HE) WLAN, RTS/CTS exchanges may be spared, and the status report polling and responding may suffice to set a protected period for a coordinated TXOP as well as indicate a CCA clear status to the coordinator AP.

In some embodiments, a protected period set by the RTS/CTS exchange or in the status report may end with the completion of a coordination process, e.g., the end of a coordination frame transmission. This can advantageously avoid unwanted non-response from the non-AP STAs because of a long protected period. The coordination frame sent from the coordinator AP specifies the remaining TXOP duration, which limits the time of the frame exchange sequence following the coordination transmission initiation.

In some embodiments, following a coordination process, a coordinated AP may perform MU-RTS/CTS exchanges with its associated non-AP STAs. The RTS and CTS frames may be transmitted only in the subchannels that are allocated to a coordinated AP by the coordinator AP in the coordination process.

In some embodiments, the BSSs associated with the coordinated APs have different primary channels which advantageously enable simultaneous transmission between the BSSs. The frame exchanges between the coordinator AP and the coordinated APs may use a same primary channel, e.g., the primary channel of the coordinator AP.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Mechanisms of Status Reporting and Protected Period Setting for Coordinated Transmission in Multiple AP System Embodiments of the present disclosure are described in detail with reference to the formats and structures of Physical Layer Convergence Protocol (PLCP) protocol data unit (PPDUs), data frames, control frames and management frames as defined in the high efficiency (HE) WLAN-based IEEE 802.11 family of Specifications and Standards. This discussion is exemplary only. The present disclosure is not limited to any specific transmission formats or structures, nor limited to any specific industry standards or specifications.

Embodiments of the present disclosure provide wireless communication mechanisms regarding CCA status reporting and NAV distribution for enabling multi-AP coordinated transmissions in a WLAN. In some embodiments, a coordinator AP may broadcast an RTS frame to a set of coordinated APs, which allows the coordinated APs with a CCA clear status to set a protected period in a CST frame and thereby silence the associated non-AP STAs. The coordinator AP also polls the coordinated APs to have them individually report their CCA statuses as well as additional information used for transmission coordination. In some embodiments, a status report from a coordinated AP may integrate the protected period setting and the CCA clean status indication, and therefore the coordinator AP can acquire the requisite information by polling for such a report and without using RTS/CTS exchanges. The status report frame may be a conventional Bandwidth Query Report (BQR) frame, or may additionally include ID, buffer status, available bandwidth, and allowable transmit power and other parameters, of each the coordinated AP. In some embodiments, a coordinated AP may set a protected period to end at the complete transmission of a coordination frame.

The coordination frame may specify the remaining TXOP duration information. Following the coordination frame, a coordinated AP may use an MU-RTS/CTS exchange with the associated APs to set another protected period based on the remaining TXOP duration information.

Figure 1A:
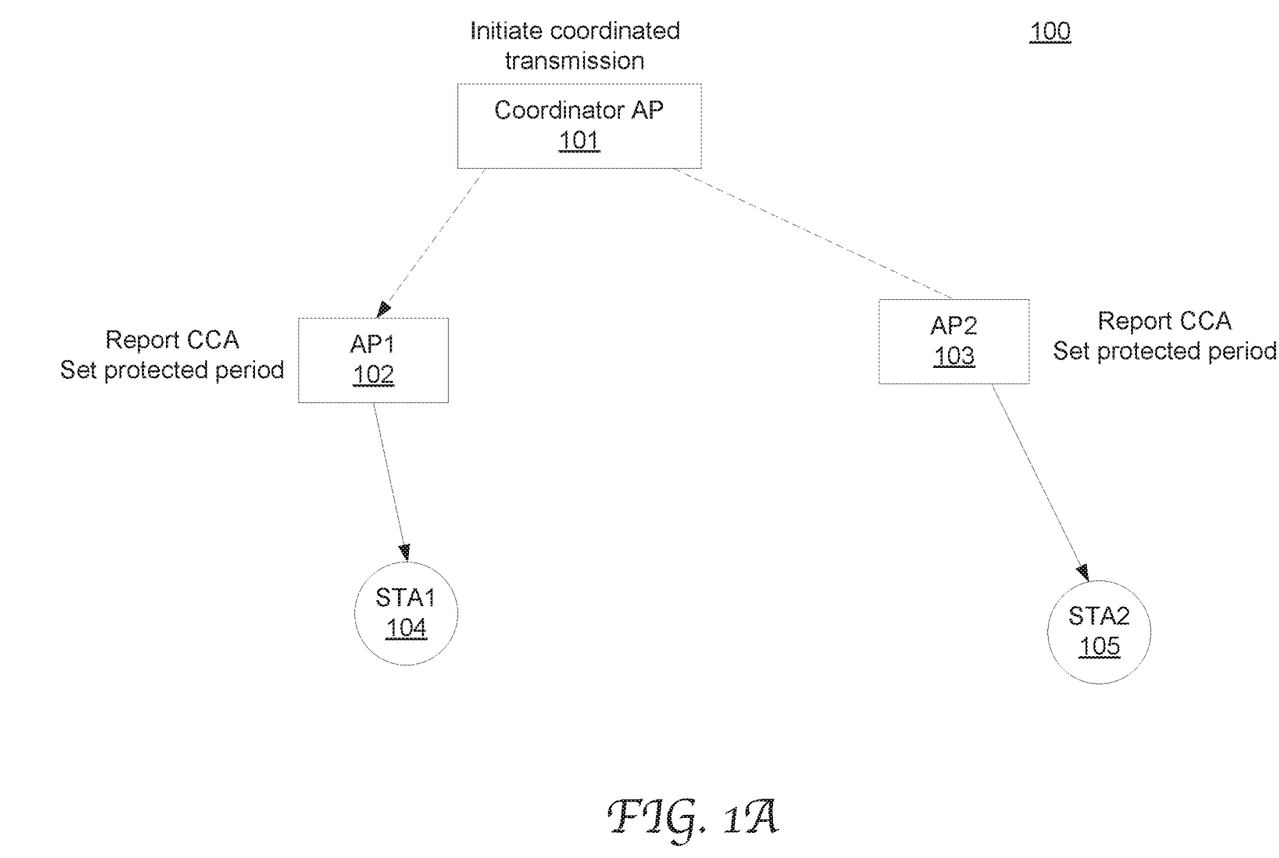
FIG. 1A shows a first exemplary WLAN in which coordinated APs can report CCA statuses to a coordinator AP and set a protected period for a coordinated transmission in accordance with an embodiment of the present disclosure.

FIG. 1A shows a first exemplary WLAN 100 in which coordinated APs can report CCA statuses to a coordinator AP and set a protected period for a coordinated transmission in accordance with an embodiment of the present disclosure. Shown in a simplified form, the WLAN 100 includes a coordinator AP 101, coordinated AP1 102 and AP2 103, and non-AP STAs, STA1 104 and STA2 105. The coordinator AP 101 can perform transmission coordination and then initiate a coordinated transmission in which AP1 102 and AP2 103 transmit simultaneously. The coordinator AP 101 can flexibly allocate the resource units (RUs) of a channel to the coordinated APs. In this example, the AP 101 is configured as a dedicated coordinator and does not directly communicate with any non-STA AP for data transmission.

According to embodiments of the present disclosure, prior to initiating a coordinated transmission, the coordinator AP 101 operates to ensure that it receives CCA clear indications from the coordinated APs. If a coordinated AP with a CCA clear status is to be included in the coordinated transmission, it sets the NAV to specify a protected period and reserves the channel. Without CCA status indication or protected period setting, one or more coordinated APs may not be able to transmit in the upcoming TXOP, which can cause significant spectral efficiency degradation. AP1 102 and AP2 103 may provide other useful information to the coordinator AP 101 to assist coordination, such as buffer statuses, available bandwidths, allowable transmit power, and etc.

Figure 1B:
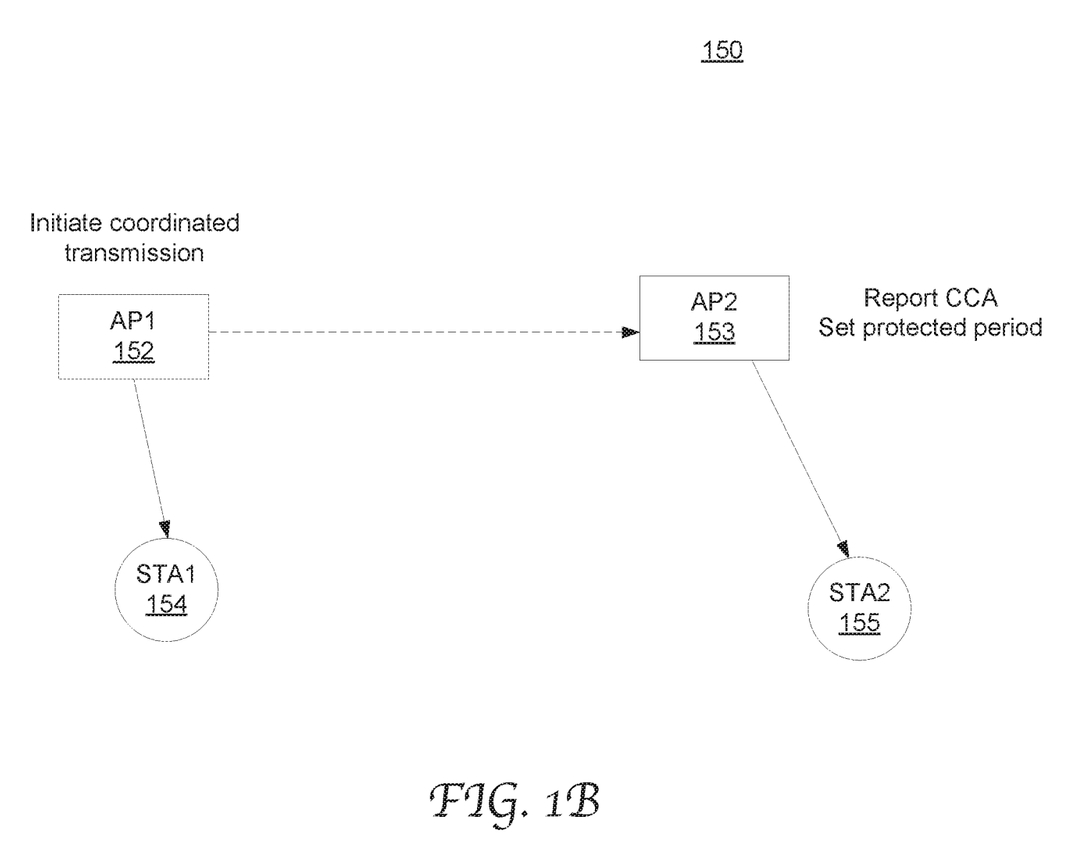
FIG. 1B shows a second exemplary WLAN in which coordinated APs can report CCA statuses to a coordinator AP and set a protected period for a coordinated transmission in accordance with an embodiment of the present disclosure.

FIG. 1B shows a second exemplary WLAN 150 in which coordinated APs can report CCA statuses to a coordinator AP and set a protected period for a coordinated transmission in accordance with an embodiment of the present disclosure. Shown in a simplified form, the WLAN 150 includes a coordinator/coordinated AP 152, a coordinated AP2 153, and non-AP STAs STA1 154 and STA2 155. AP1 152 assumes the dual role of a coordinator AP and a coordinated AP. That is, AP1 152 can perform transmission coordination and then initiate a coordinated transmission in which AP1 152 and AP2 153 transmit simultaneously. AP1 can flexibly allocate the resource units (RUs) of a channel to the APs.

According to embodiments of the present disclosure, prior to initiating a coordinated transmission, AP1 152 operates to ensure that it is CCA clear and that it receives a CCA clear indication from the coordinated AP AP2 153. Both APs set the NAV to specify a protected period and reserve the channel. AP2 153 may provide other useful information to the coordinator AP1 152 to assist the coordination process, such as buffer statuses, available bandwidths, allowable transmit power, and etc.

Figure 2A:
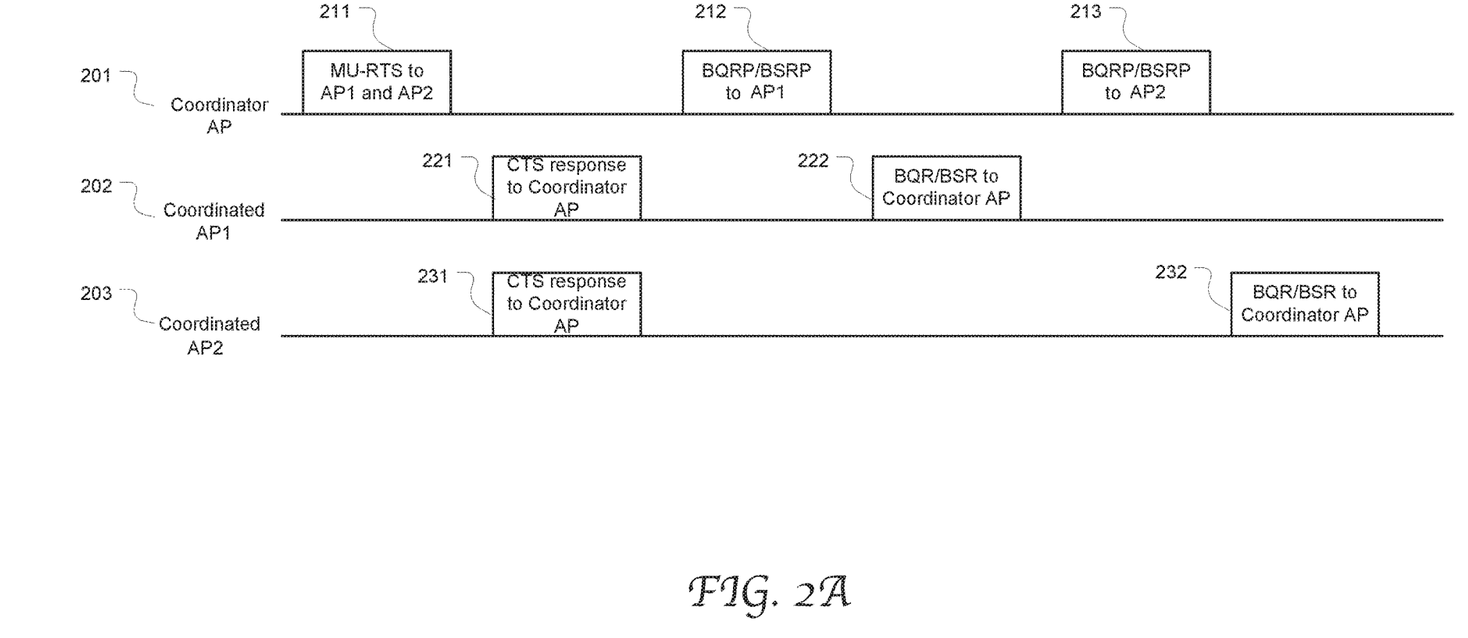
FIG. 2A illustrates a first exemplary frame exchange sequence between a coordinator AP and multiple coordinated APs with regard to CCA status indication and protected period setting in accordance with an embodiment of the present disclosure.

FIG. 2A illustrates a first exemplary frame exchange sequence between a coordinator AP and multiple coordinated APs with regard to CCA status indication and protected period setting in accordance with an embodiment of the present disclosure. The coordinator AP 201 and the coordinated APs 202 and 203 are included in a WLAN as shown in FIG. 1A. Multi-user request-to-send/clear-to-send (MU-RTS/CTS) frames are exchanged to allow the coordinator AP and the coordinated APs to set a protected period. As defined in the RTS/CTS protocol, if an AP has its medium idle and so has a CCA clear status, it responds with a CTS frame with a specified protected period; otherwise, it does not respond. Further, multiple coordinated APs simultaneously respond to an RTS frame with identical CTS frames which do not carry information specific to a coordinated AP. Therefore the coordinator AP cannot determine which coordinated AP has idle medium and which can be included in the coordinated transmission. To this end, the coordinator AP 201 then polls the coordinated APs individually to request their CCA statuses as well as other information to be used for the coordination process.

More specifically, the coordinator AP first broadcasts a multi-user RTS frame 211 to the coordinated APs, AP1 202 and AP2 203. In this example, both AP1 202 and AP2 203 have idle medium as determined in the CCA processes and respond with the CTS response frames 221 and 231 to the coordinator AP 201. The coordinator AP then transmits a poll frame 212 or 213 (e.g., Bandwidth Query Report Poll (BQRP) frame) to each individual coordinated AP. A coordinated AP 202 or 203 responds with a BQR 222 or 232 (see FIG. 3A) only if its medium is idle. In this manner, the coordinator AP 201 can identify which coordinated AP is available for the coordinated transmission. The coordinator AP 201 then uses the information in the CTS frames 221 and 231, and in the BQRs or BSRs 222 and 232 to make decisions for coordination.

In some embodiments, the frames illustrated in FIG. 2A may have the formats and structures defined in the IEEE 802.11ax Standards and Specifications. In some other embodiments, a report frame 222 or 223 may includes all the fields in a BQR and a set of additional fields (see FIG. 3A), herein referred as Bandwidth Status Report (BSR). Correspondingly the poll frames 212 and 213 are referred as BSR Poll (BSRP) frames.

Figure 2B:
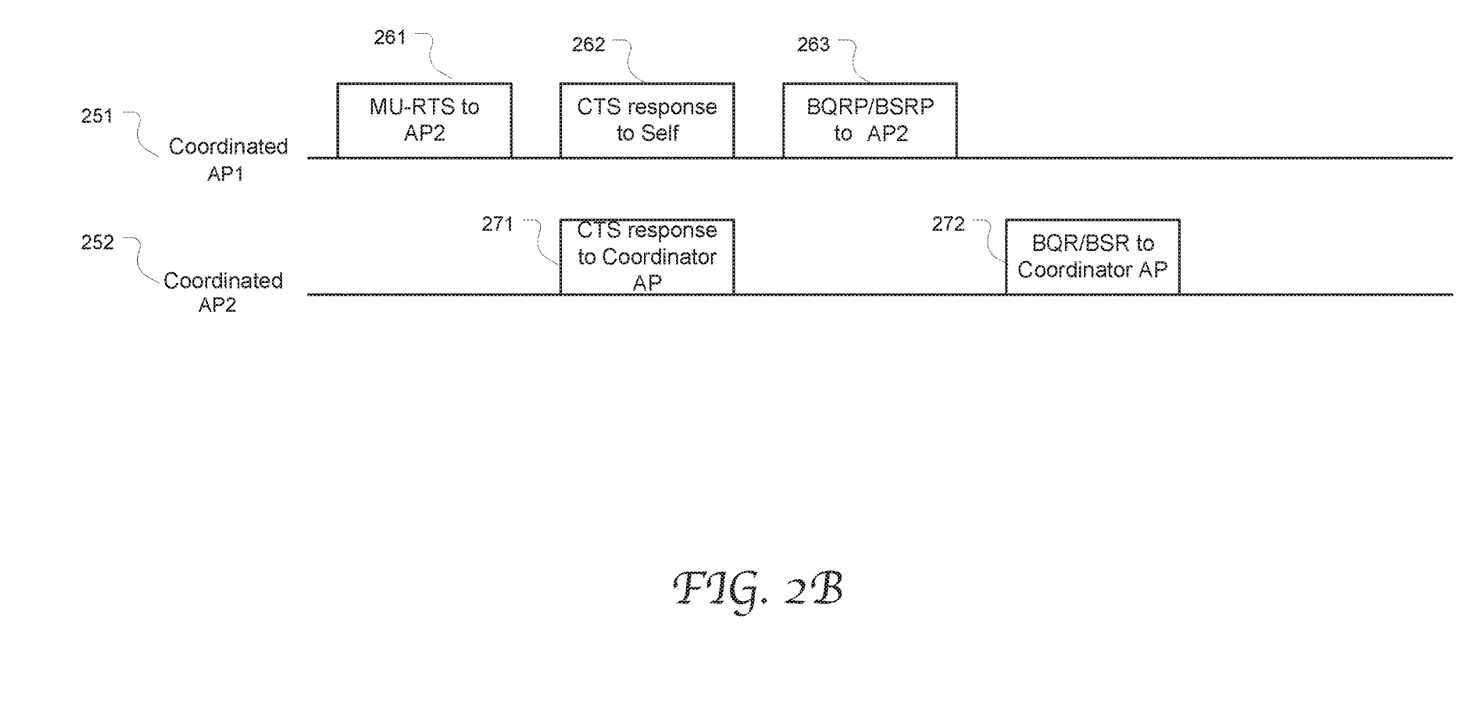
FIG. 2B illustrates a second exemplary frame exchange sequence between a coordinator AP and multiple coordinated APs with regard to CCA status indication and protected period setting in accordance with an embodiment of the present disclosure.

FIG. 2B is a timing diagram that illustrates a second exemplary frame exchange sequence between a coordinator AP and multiple coordinated APs with regard to CCA status indication and protected period setting in accordance with an embodiment of the present disclosure. One of the coordinated AP1 251 also operates as a coordinator AP as shown in FIG. 1B. The coordinator-coordinated AP1 251 sends a multi-user RTS frame 261 to a coordinated AP2 252. In response, the coordinator-coordinated AP1 251 generates a CTS frame to itself and receives a CTS frame from the coordinated AP2 252. A protected period is specified in the CTS frames. The coordinator-coordinated AP1 251 then sends a BQRP or BSQR frame to poll the coordinated AP2 252 for its CCA status as well as other information to be used for the coordination process. The coordinated AP2 252 responds with a BQR or BSR to the coordinator-coordinated AP1 251. The coordinator-coordinated AP1 251 then uses the information in the CTS responses to self 262, the CTS responses to coordinator 271, and the BQR or BSR 272 to make decisions for coordination.

Figure 3A:
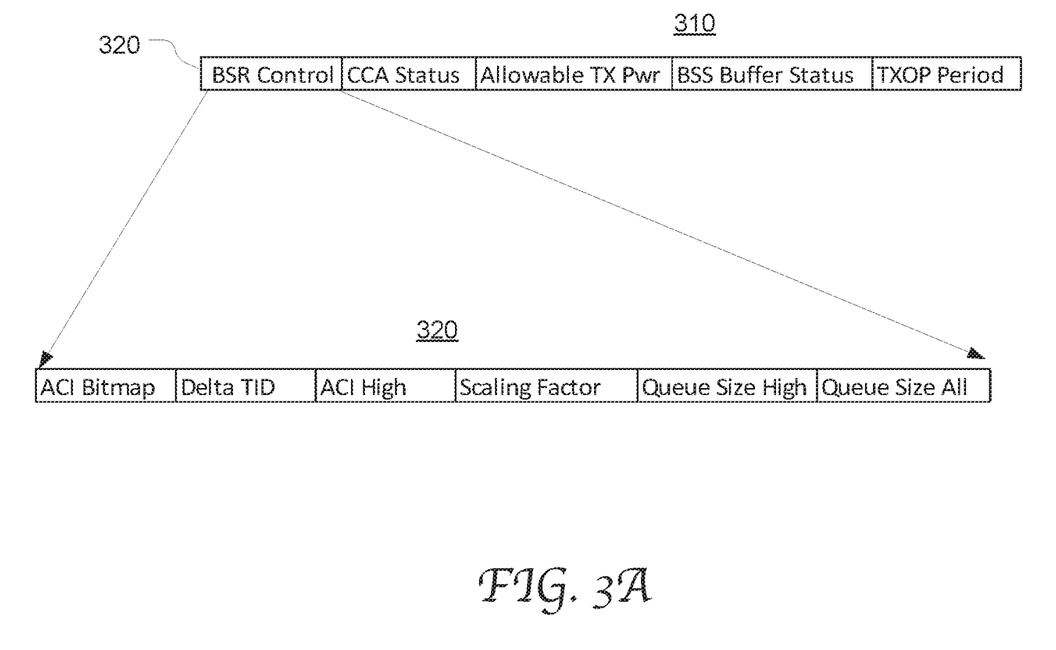
FIG. 3A illustrates the content in an exemplary bandwidth status report (BSR) in accordance with an embodiment of the present disclosure.

FIG. 3A illustrates the fields in an exemplary bandwidth status report (BSR) in accordance with an embodiment of the present disclosure. The BSR 310 includes all the subfields in a conventional BQR 320, e.g., access category indicator (ACI) bitmap, delta traffic identifier (TID), ACI high, scaling factor, queue size high and queue size all. The definitions for the subfields are well known in the art and omitted herein for brevity. According to embodiments of the present disclosure, a BSR includes additional fields to report CCA status, allowable transmit power, Basic Service Set (BSS) buffer status and TXOP period. Such information is useful for the coordinator to make decisions in the coordination process.

Particularly, the specified TXOP period is operable to silence the non-AP STAs in the upcoming coordinated transmission. BSS status indicates the buffer status of the coordinated AP's serving BSS. For example, the downlink frames sent from the coordinated AP to its associated non-AP STAs and the uplink frames sent from its associated STAs to the coordinated AP are incorporated in the BSS buffer status reporting. In addition, the BSR may also include buffer status for the uplink frames from the coordinated AP to the coordinator AP. In some embodiments, the CCA status subfield may be excluded from the BSR 310 since the mere fact of responding with a BSR adequately indicates a CCA clear status of the coordinated AP.

Figure 3B:
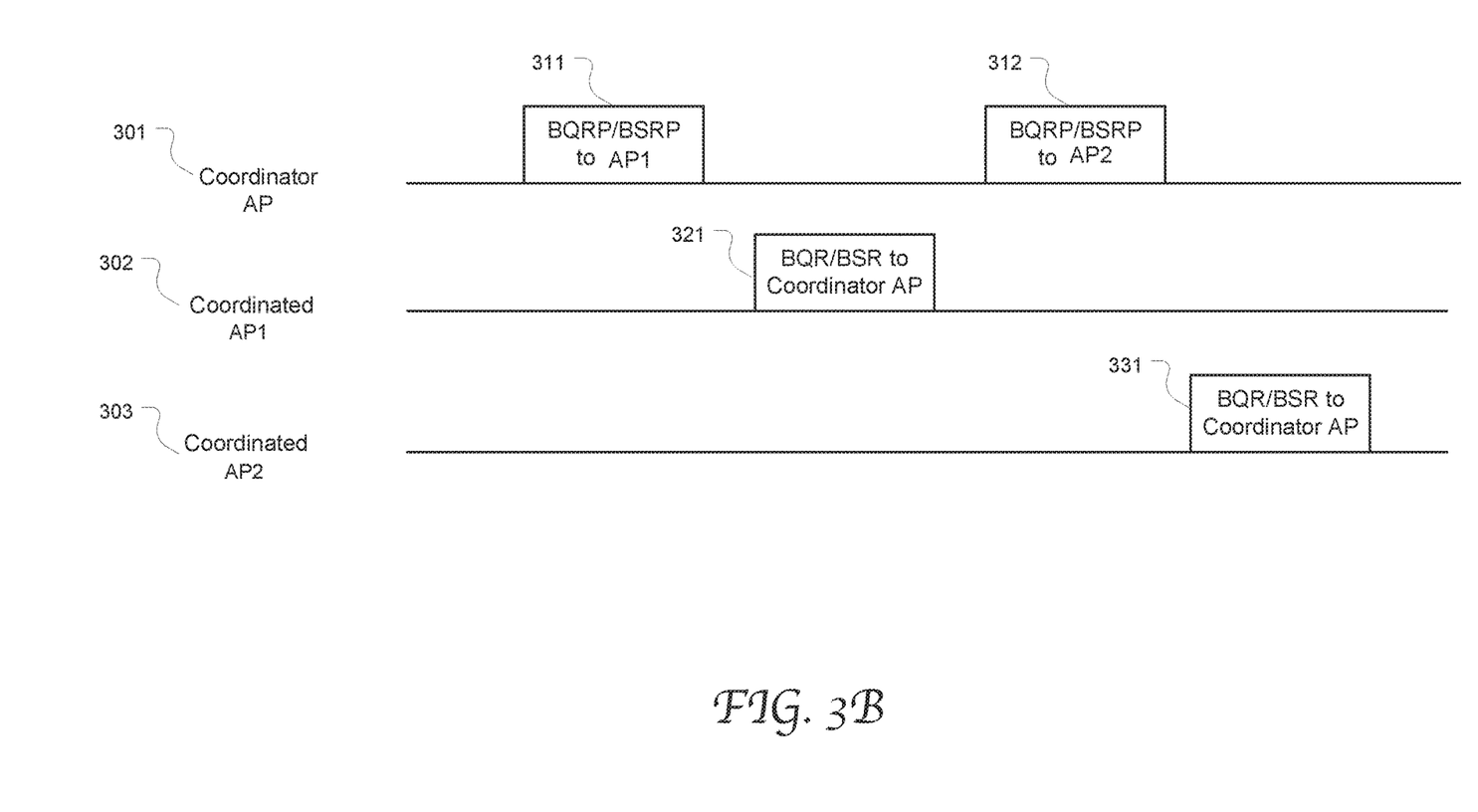
FIG. 3B illustrates a third exemplary frame exchange sequence between a coordinator AP and coordinated APs with regard to CCA status indication and protected period setting in accordance with an embodiment of the present disclosure.

In a WLAN including only post-high efficiency (HE) STAs and no earlier legacy devices, an STA only need to specify protected periods against STAs that are compliant with the IEEE 802.11ax Stands and Specifications and post-HE STA. For example, all the STAs in the WLAN operate on the 6 GHz band. In such a WLAN, an RTS/CTS process may be spared since it is mainly used for purposes of backward-compatibility with legacy STAs. Instead, BQR or BSR frames can be used to indicate CCA statuses as well as set protected periods. FIG. 3B is a timing diagram that illustrates a third exemplary process of communication between a coordinator AP and coordinated APs with regard to CCA status indication and protected period setting in accordance with an embodiment of the present disclosure. The coordinator AP 301 and the coordinated APs 302 and 303 are included in a WLAN as shown in FIG. 3B. The coordinator AP 301 polls the coordinated APs individually, e.g., by transmitting the poll frames 311 and 312 sequentially, the coordinated AP1 302 and AP2 303. The coordinated APs 302 and AP2 303 each respond with a BQR or BSR 321 or 331 with information as shown in FIG. 3A. The coordinator AP 301 then uses the information in the BQRs or BSRs 321 and 331 to make decisions for coordination.

Figure 3C:
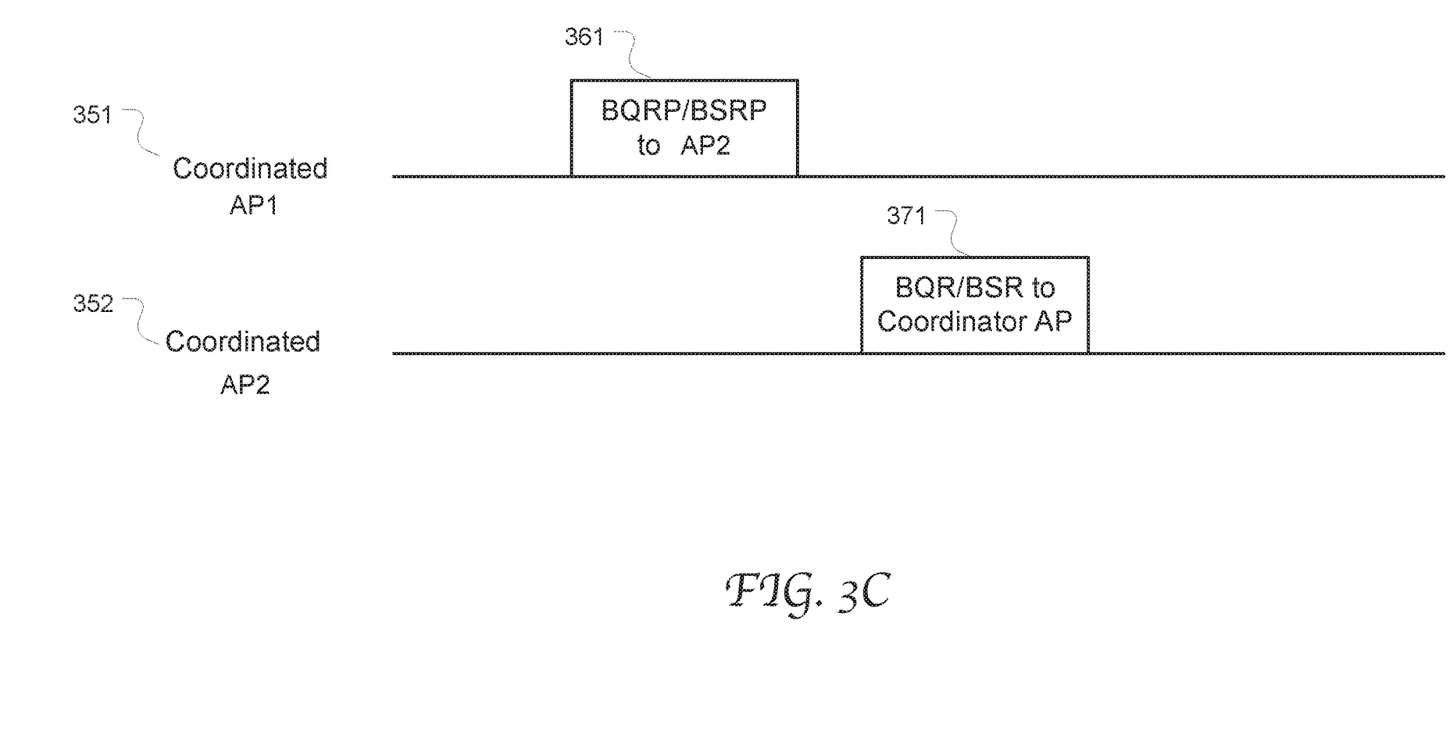
FIG. 3C is a timing diagram that illustrates a fourth exemplary frame exchange sequence between a coordinator AP and coordinated APs with regard to CCA status indication and protected period setting in accordance with an embodiment of the present disclosure.

FIG. 3C is a timing diagram that illustrates a fourth exemplary frame exchange sequence between a coordinator AP and coordinated APs with regard to CCA status indication and protected period setting in accordance with an embodiment of the present disclosure. One of the coordinated AP 351 also acts as the coordinator AP. For example, the APs 351 and 352 are included in a WLAN as shown in FIG. 1B. The coordinator-coordinated AP1 351 polls the coordinated AP2 352 by transmitting a poll frame 361, and the coordinated AP2 352 responds with a BQR or BSR 371 with information as shown in FIG. 3A. The coordinator-coordinated AP1 351 then use the information in the BQR or BSR 371 provided by AP2 352 and the related information about itself to make decisions for coordination.

Figure 4A:
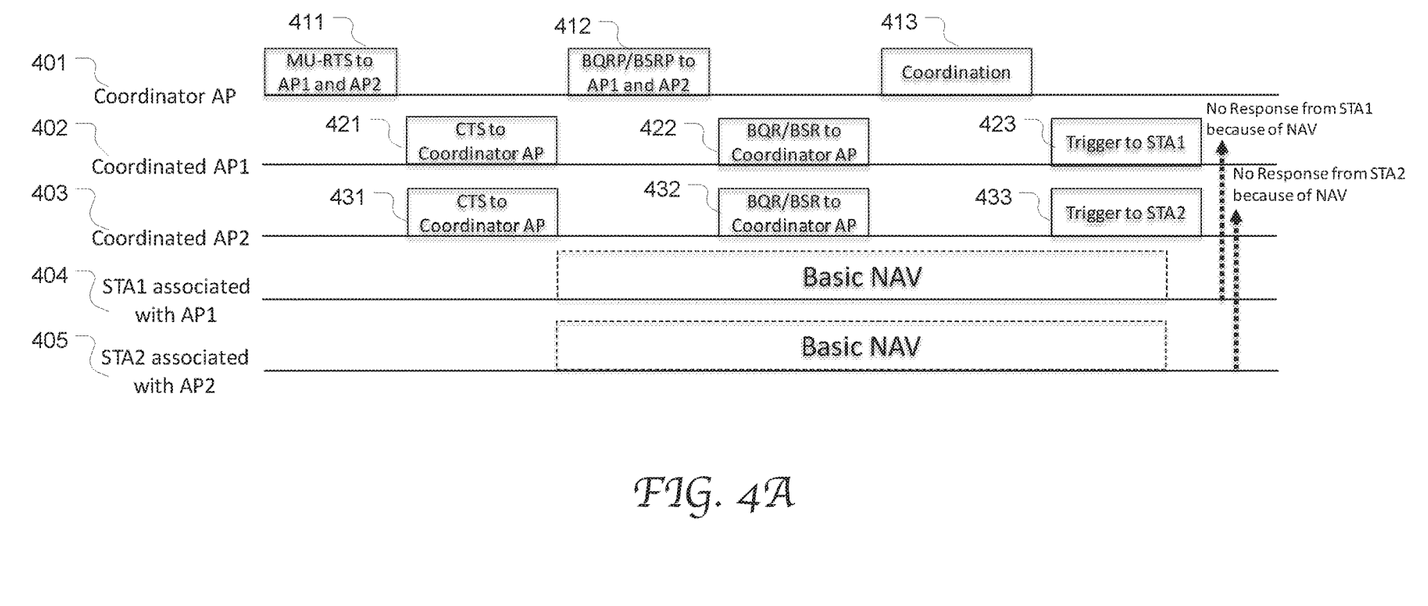
FIG. 4A illustrates an exemplary frame exchange sequence in a coordinated multi-AP system and the NAV timer setting in accordance with an embodiment of the present disclosure.

In some embodiments, a specified protected period may cause the non-AP STAs to set the NAV timers to extend substantially beyond the end of a coordination process. FIG. 4A is a timing diagram that illustrates an exemplary frame exchange sequence in a coordinated multi-AP system and the NAV timer setting in accordance with an embodiment of the present disclosure. The coordinator AP 401, the coordinated APs 402 and 403, and the non-AP STAs 404 and 405 are arranged in a WLAN as shown in FIG. 1A. Similar with the sequences shown in FIGS. 2A and 2B, MU-RTS/CTS frames 411, 412, 421 and 431 are exchanged to allow the coordinated APs 402 and 404 to set a protected period. In response to the CTS frames 421 and 431, the non-AP STAs 404 and 405 set a basic NAV timer (shown by the dotted rectangles) and refrain from accessing the medium during this period.

The coordinator AP further transmits a BQRP or BSRP frame 412 to poll the coordinated APs 402 and 403, which respond with their BQRs or BSRs 422 and 432 (see FIG. 3A) because the medium is idle. The coordinator AP 401 then uses the information in the CTS frames 421 and 431 and in the BQRs or BSRs 422 and 432 to make decisions for coordination and accordingly transmit a coordination frame 413. For example, the coordination frame may specify the channels or subchannels allocated to the coordinated APs.

In the CTS frames 421 and 431, the receiver address field is set to the BSSID of the coordinator AP. After receiving the RTS/CTS frames 411, 421 and 431, non-AP STAs associated with the coordinated APs set the Basic NAV (e.g., intra-BSS NAV) because the received CTS frame is treated as an inter-BSS frame. In this example, the non-AP STAs 404 and 405 set the basic NAV to a long period and beyond the end of the coordination frame transmission. The coordinated APs 402 and 403 send trigger frames 423 and 433 to STA1 and STA2 before the Basic NAV timer expires and expect to receive trigger-based PPDUs (TB PPDUs) from the STAs at the times marked by the dotted arrows. However STA1 404 and STA2 405 may not be able to respond because of they are still limited by the long basic NAV setting. This situation may be problematic in some application scenarios.

Figure 4B:
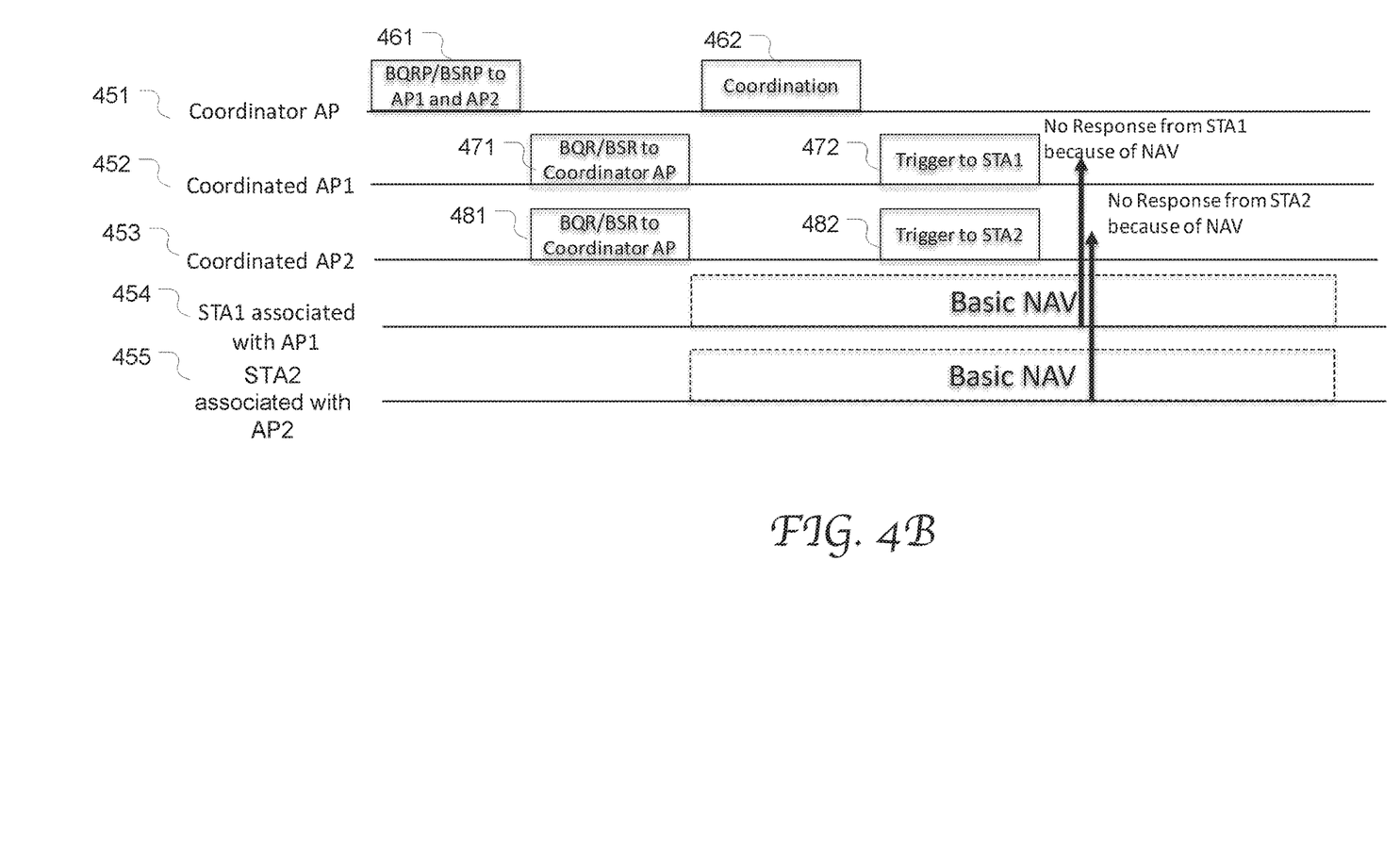
FIG. 4B illustrates another exemplary frame exchange sequence in a coordinated multi-AP system and the NAV timer setting in accordance with an embodiment of the present disclosure.

FIG. 4B is a timing diagram that illustrates another exemplary frame exchange sequence in a coordinated multi-AP system and the NAV timer setting in accordance with an embodiment of the present disclosure. For example, the coordinator AP 451 and the coordinated APs 452 and 453, and the non-AP STAs 454 and 455 are included in a WLAN as shown in FIG. 1A. Similar with the sequences shown in FIGS. 3B and 3C, RTS/CTS is not used for coordination purposes. The coordinator AP 451 sends a BQRP or BSRP frame 461 to the coordinated APs 452 and 453 which respond with BQRs or BSRs 471 and 478. The BSS color field of the HE TB PPDUs carrying the BQR frames or BSR frames 471 and 481 is set to the BSS color of the coordinator AP 451. The BQRs or BSRs 471 and 478 specify a protected period in the TXOP duration field in the PHY header, and STA1 454 and STA2 455 receiving the HE TB PPDUs accordingly set the basic NAV timers and refrain from accessing the channel during this period. The HE TB PPDUs are treated as inter-BSS frames. The BSS color of each AP may be different. The coordinator AP 451 then sends a coordination frame 462 to AP1 472 and AP2 482. The NAV timers expire long after the coordination frame is transmitted.

The coordinated APs 452 and 453 send trigger frames 472 and 482 to STA1 and STA2 454 and 455 before the Basic NAV timers expire and expect to receive trigger-based PPDUs (TB PPDUs) from the non-AP STAs at the times marked by the dotted arrows. However, STA1 and STA2 may fail to respond because of they are still limited by the long basic NAV setting.

Figure 5:
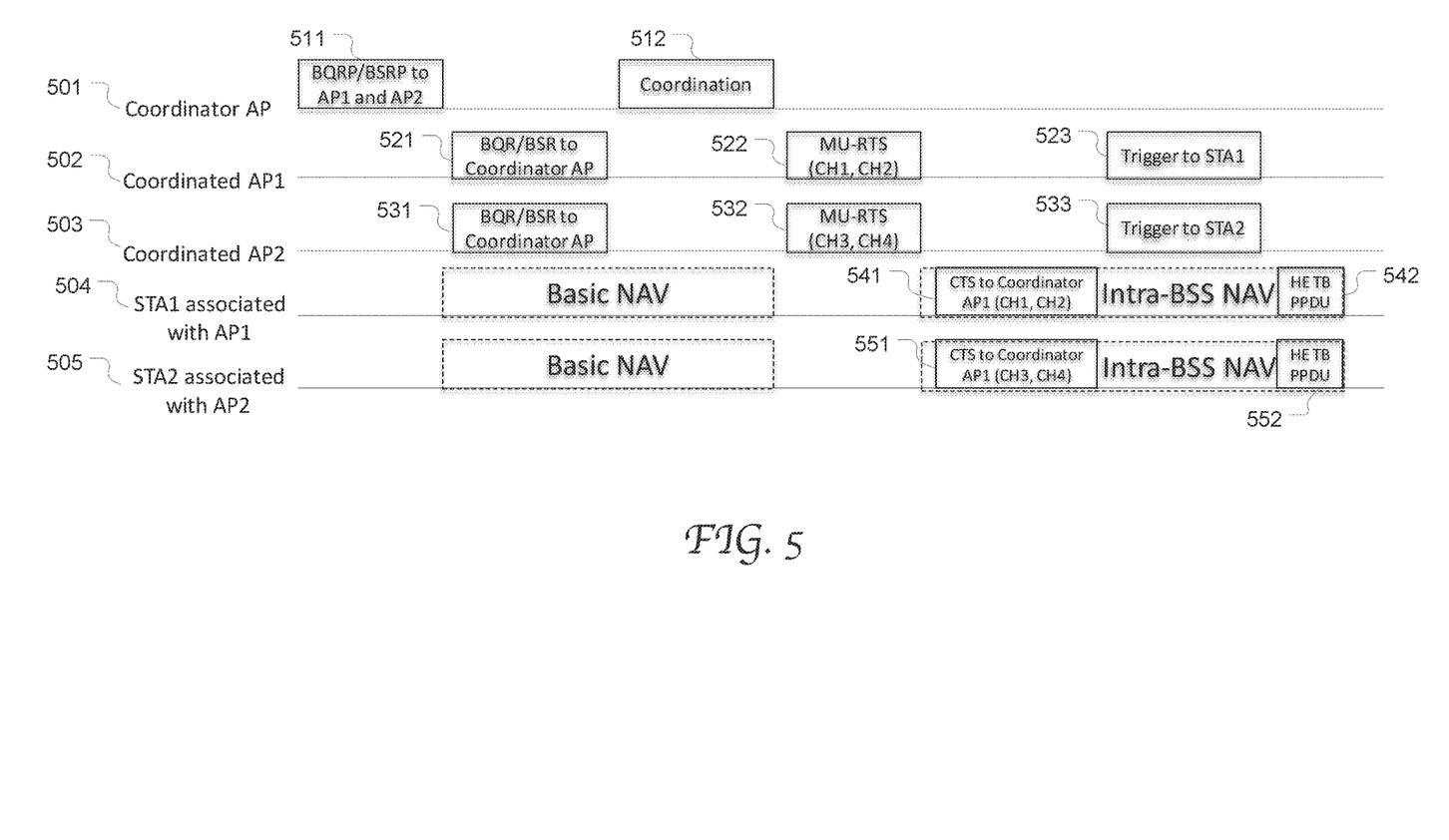
FIG. 5 illustrates still another exemplary frame exchange sequence in a coordinated multi-AP system and the NAV timer setting in accordance with an embodiment of the present disclosure.

In some embodiments, the NAV information exchange between the coordinator AP and coordinated APs only cover up to the end of the coordination process. FIG. 5 is a timing diagram that illustrates still another exemplary frame exchange sequence in a coordinated multi-AP system and the NAV timer setting in accordance with an embodiment of the present disclosure. For example, the coordinator AP 501 and the coordinated APs 502 and 503, and the non-AP STAs 504 and 505 are included in a WLAN as shown in FIG. 1A. Similar with the sequences shown in FIGS. 3B and 3C, RTS/CTS exchanges are not used for coordination purposes. The coordinator AP 501 sends a BQRP or BSRP frame 511 to the coordinated APs 502 and 503 which respond with BQRs or BSRs 521 and 531 including a specified protected period in the TXOP duration field in the PHY header. The STA1 504 and STA2 505 receiving the BQR or BSR frames accordingly set the basic NAV timers which only cover up to the end of the coordination process. For example, the coordination process includes the coordinator AP making coordination decisions based on the BQRs or BSRs 521 and 531 and then transmitting a coordination frame 512 to the coordinated APs 502 and 503. Thus, the basic NAV timers expire when the coordination frame is completely transmitted.

The coordination frame 512 includes the information regarding the remaining coordination TXOP duration. In some embodiments, after the coordination process is completed, the coordinated APs may perform the protection mechanism, e.g., by using MU-RTS/CTS exchanges, within the coordinated bandwidth with regard to the associated non-AP STAs. More specifically, after receiving the coordination frame 512, the coordinated APs 502 and 503 transmit MU-RTS frames 522 and 532 only in respectively allocated channels. The coordination frame indicates that CH1 and CH2 are allocated to AP1 502, and CH3 and CH4 are allocated to for AP2 503. In response, the STA1 504 and STA2 505 send CTS frames 541 and 551 to the coordinated APs 502 and 503, and also set intra-BSS NAV timers based on the remaining TXOP duration indicated in the coordination frame 512. In the coordinated transmission, AP1 sends a trigger frame 523 to STA1, and AP2 sends a trigger frame 533 to STA2. The intra-BSS NAV timers expire when the trigger frames are completely transmitted. As a result, STA1 and STA2 can respond with transmissions of the HE TB PPDUs 542 and 552.

In some embodiments, the BSSs associated with the multiple coordinated APs have different primary channels. This is advantageous for simultaneous transmission between the BSSs. For instance, the primary channels of AP1's serving BSS and AP2's serving BSS are CH1 and CH4, respectively. However, the frame exchanges between the coordinator AP 501 and the coordinated APs 502 and 503 may use the same primary channel which may be the primary channel of the coordinator AP 501.

Figure 6:
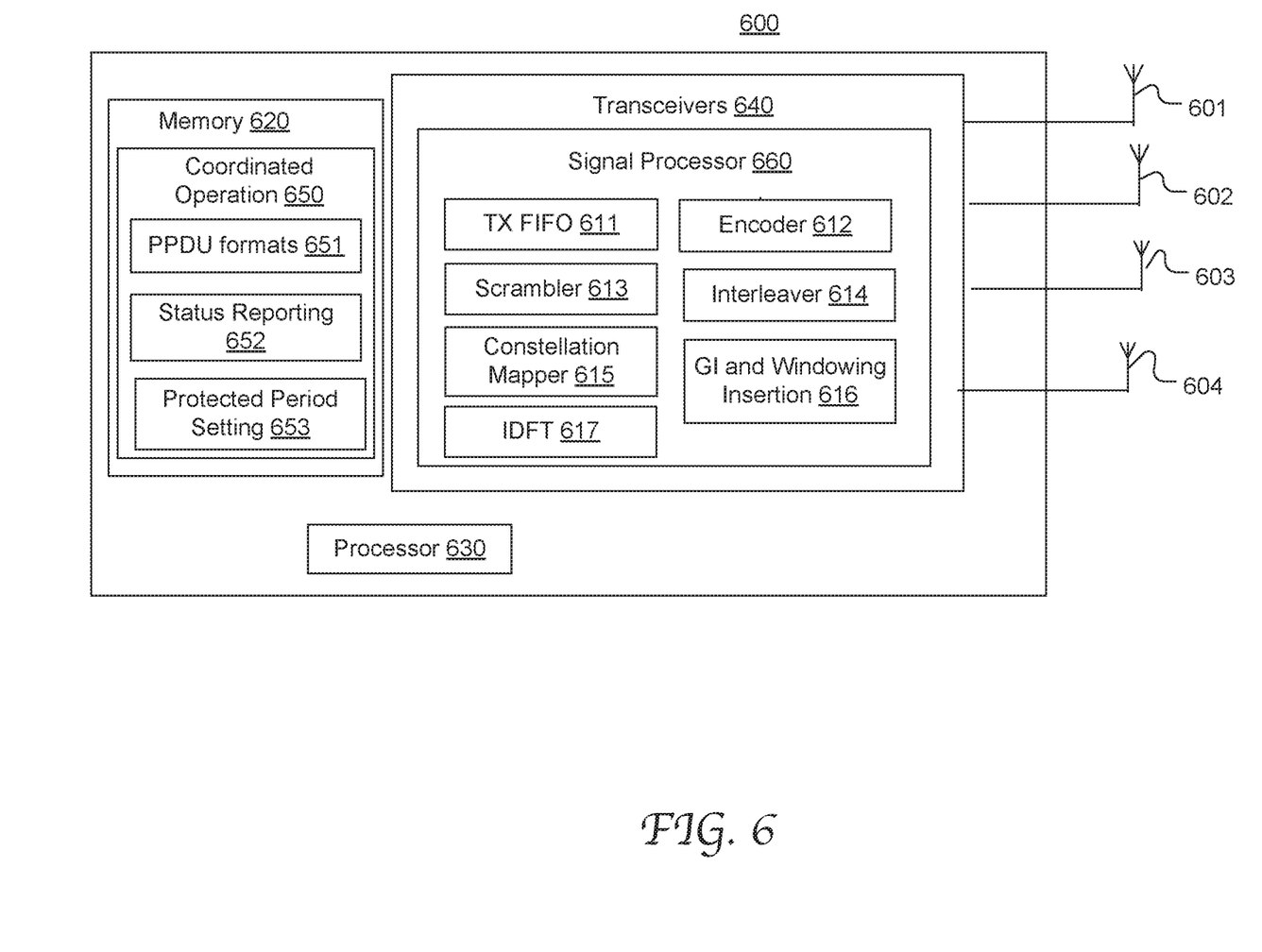
FIG. 6 is a block diagram of an exemplary wireless communication device configured to determine CCA statuses and collect protected periods for coordinated transmissions in multi-AP WLAN in accordance with an embodiment of the present disclosure.

It will be appreciated that the disclosed mechanism of limiting the basic NAV timers to the end of a coordination process and then incrementing updating the NAV can also be used in the embodiments that the coordinator AP exchanges RTS/CTS frames with the coordinated APs, as shown in FIGS. 2A and 2B. The present disclosure is not limited to any specific architecture number of coordinated APs, FIG. 6 is a block diagram of an exemplary wireless communication device configured to acquire CCA statuses and enable NAV distribution for coordinated transmissions in multi-AP WLAN in accordance with an embodiment of the present disclosure. The communication device 600 may be configured as a coordinator AP or a coordinator-coordinated AP, and may be a device having a transceiver configured for data communication and WLAN management, e.g., a router, a general purpose computer, a smart phone, a portable electronic device, a tablet wearable device, a sensor used on Internet of Things (IoT), and etc.

The device 600 includes a main processor 630, a memory 620 and a transceiver 640 coupled to an array of antenna 601-604. The memory 620 stores a coordinated operation module 621 operable to coordinate transmissions among coordinated APs and non-AP STAs. The coordinated operation module 621 includes a PPDU format module 651 in compliance with one or more communication protocols and standards. The module 651 stores the formats and field definitions of various types of frames that can be transmitted from or received by the device 600, such as PPDUs carrying RTS/CTS frames, BQR and BSR frames, coordination frames, data frames and etc.

In addition, the coordinated operation module 650 stores processor-executable instructions that implement the mechanism of effective CCA status indication (by module 652) and protected period setting (by module 653) as described in greater detail with reference to FIG. 1A~FIG. 5.

The transceiver 640 includes a signal processor 660 having various modules of the transmit path which is configured to generate communication transmission units. For instance, the signal processor 660 includes a transmit First-In-First-Out (TX FIFO) 611, an encoder 612, a scrambler 613, an interleaver 614, a constellation mapper 615, an inversed discrete Fourier transformer (IDFT) 617, and a guard interval (GI) and windowing insertion module 616. The signal processor 660 also includes a receive path, detailed illustration and description of which are omitted for brevity.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of performing coordinated transmissions performed by a coordinator access point (AP) in a wireless local area network (WLAN), said method comprising:
   polling a set of coordinated APs to provide results of clear channel assessment (CCA) processes for a coordinated transmission opportunity (TXOP);
   receiving a status report from each coordinated AP in said set of coordinated APs, wherein said status report specifies: a first buffer status for uplink frames transmitted from said coordinated AP to said coordinator AP; and an allowable bandwidth for said first coordinated TXOP;
   using reception of said status report at said coordinator AP as an indication of a channel clear status of said coordinated AP that results from a CCA process;
   receiving a specified protected period from said coordinated AP regarding said first coordinated TXOP, wherein a non-AP STA associated with said coordinated AP refrains from accessing transmission medium during said specified protected period; and
   performing a coordination process before initiating said coordinated TXOP.

2. The method of claim 1, further comprising:
   before said polling, transmitting a multi-user (MU) request-to-send frame (RTS) to said set of coordinated APs; and
   receiving same clear-to-sent (CTS) frames simultaneously from said set of coordinated APs, wherein said CTS frames comprise said specified protected period.

3. The method of claim 2, wherein said coordinator AP is configured to operate as a coordinated AP in said first coordinated TXOP to transmit data simultaneously with set of coordinated APs.

4. The method of claim 1, wherein said polling comprises transmitting a set of status report polls to said set of coordinated APs in sequence, and wherein a respective status report poll is transmitted to a coordinated AP after a status report is received from another coordinated AP.

5. The method of claim 1, wherein said status report further comprises one or more of: an allowable transmission power for said first coordinated TXOP; a second buffer status with regard to a Basic Service Set (BSS) served by said coordinated AP; and a TXOP period for said first coordinated TXOP.

6. The method of claim 1, wherein no request-to-send frame (RTS) is transmitted to said set of coordinated APs with regard to said first coordinated TXOP, wherein said polling comprises transmitting status report polls to said set of coordinated APs, and wherein said status report polls comprise requests to specify protected periods by said set of coordinated APs for said first coordinated TXOP.

7. The method of claim 6, wherein said receiving said specified protected period comprises receiving a status report from each coordinated AP, and wherein said status report comprises said specified protected period.

8. The method of claim 6, wherein said coordination process comprises:
   allocating channels to said one or more coordinated APs based on received status reports; and
   transmitting a coordination frame to said set of coordinated APs.

9. The method of claim 8, wherein said specified protected period ends substantially at a completion of said coordination process, and wherein said coordination frame specifies a remaining TXOP duration for data transmission in said first coordinated TXOP.

10. The method of claim 1, further comprising: responsive to non-delivery of status reports from remaining coordinated APs of said set of coordinated APs, determining that said remaining coordinated APs have a medium busy status; and excluding said remaining coordinated APs from said coordination process and said first coordinated TXOP.

11. A method of coordinated transmission performed by a first coordinated access point (AP) in a wireless local area network (WLAN), said method comprising:
   signaling a first protected period regarding a first coordinated transmission opportunity (TXOP);
   in response to a status report poll from a coordinator AP, transmitting a status report to said coordinator AP to indicate a channel clear status resulting from a clear channel assessment (CCA) process, and wherein said status report specifies:
      a first buffer status for uplink frames transmitted from said first coordinated AP to said coordinator AP; and
      an allowable bandwidth for said first coordinated TXOP;
   receiving a coordination frame from said coordinator AP that specifies coordination information for said first coordinated AP and a second coordinated AP in said first transmission TXOP; and
   transmitting data in said first transmission TXOP based on said coordination frame, wherein said first protected period is specified to prevent a non-AP STA associated with said first coordinated AP from accessing transmission medium.

12. The method of claim 11, further comprising receiving a multi-user (MU) request-to-send frame (RTS) from said coordinator AP, wherein said signaling said first protected period comprises transmitting a clear-to-sent (CTS) frame simultaneously with said second coordinated AP, wherein said CTS frame comprises said specified protected period.

13. The method of claim 11, wherein said status report further comprises one or more of: an allowable transmission power for said first coordinated TXOP; a second buffer status with regard to a Basic Service Set (BSS) served by said first coordinated AP; and a TXOP period for said first coordinated TXOP.

14. The method of claim 11, wherein no request-to-send frame (RTS) is received by said first coordinated AP regarding said first coordinated TXOP, and wherein said status report specifies said first protected period.

15. The method of claim 11, wherein said first protected period ends substantially at reception of said coordination frame, and wherein said coordination frame specifies a remaining TXOP duration for data transmission in said first coordinated TXOP.

16. The method of claim 15, wherein said coordination frame specifics one or more coordinated channels allocated to said first coordinated AP, and further comprising:
   in response to said coordination frame, transmitting an MU-RTS frame within said one or more coordinated channels for one or more associated non-AP STAs; and
   receiving CTS frames from said one or more associated non-AP STAs in said one or more coordinated channels.

17. The method of claim 16, wherein Basic Service Sets (BSSs) associated with said first coordinated AP and said second coordinated AP comprise different primary channels.

18. The method of claim 11, wherein said coordinator AP uses a same primary channel for communication between said first coordinated AP and said coordinator AP.

19. A device configured as a coordinated AP for a first coordinated transmission opportunity (TXOP), said device comprising:
   a memory;
   a processor coupled to the memory, wherein said memory comprises instructions that, when executed by said processor, cause said device to perform a method comprising: in response to a status report poll from a coordinator AP, transmitting a status report to said coordinator AP, wherein said status report is operable to indicate a channel clear status resulting from a channel assessment (CCA) process to said coordinator AP, and wherein further said status report specifies:
      a first buffer status for uplink frames transmitted from said first coordinated AP to said coordinator AP;
      an allowable bandwidth for said first coordinated TXOP;
      an allowable transmission power for said first coordinated TXOP;
      a second buffer status with regard to a Basic Service Set (BSS) served by said first coordinated AP;
      a first protected period, wherein said first protected period is operable to prohibit a non-AP STA associated with said first coordinated AP from transmitting; and
      a TXOP period for said first coordinated TXOP;
   receiving a coordination frame from said coordinator AP that specifies coordination information for said first coordinated AP and a second coordinated AP in said first transmission TXOP; and
   transmitting data in said first transmission TXOP based on said coordination frame.

20. The device of claim 19, wherein said first protected period ends substantially at reception of said coordination frame, and wherein said coordination frame specifies a remaining TXOP duration for data transmission in said first coordinated TXOP.

21. The device of claim 20, wherein said coordination frame specifies one or more coordinated channels allocated to said first coordinated AP, and wherein said method further comprises:

in response to said coordination frame, transmitting an MU RTS frame within said one or more coordinated channels for one or more associated non-AP STAs; and receiving CTS frames from said one or more associated non-AP STAs in said one or more coordinated channels.

22. The device of claim 19, wherein, a first Basic Service Set (BSS) associated with said first coordinated AP and a second Basic Service Set (BSS) associated with said second coordinated AP have different primary channels.

23. The device of claim 19, wherein a primary channel of said coordinator AP is used for frame exchanges between said first coordinated AP and said coordinator AP.

\* \* \* \* \*